United States Patent Office 3,424,514
Patented Jan. 28, 1969

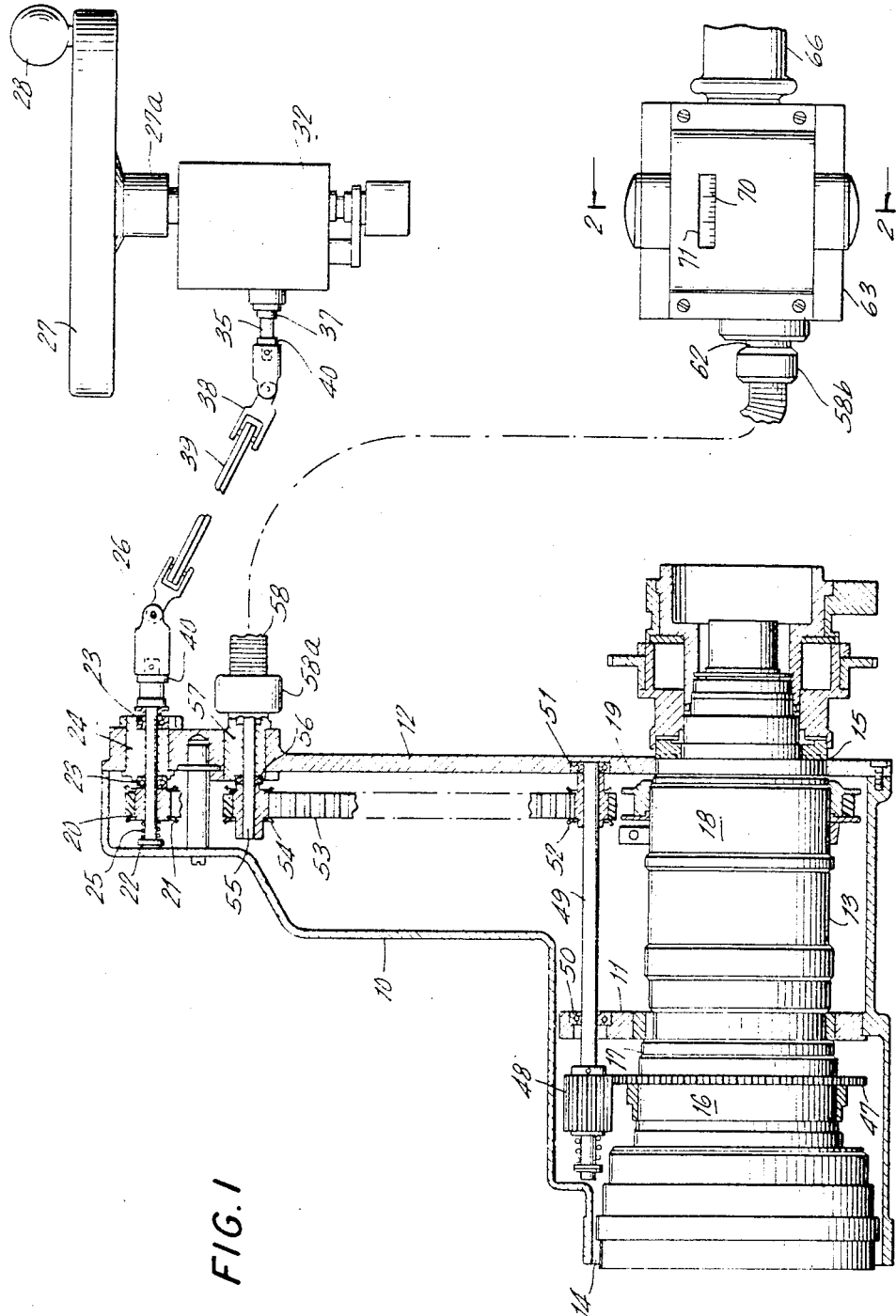

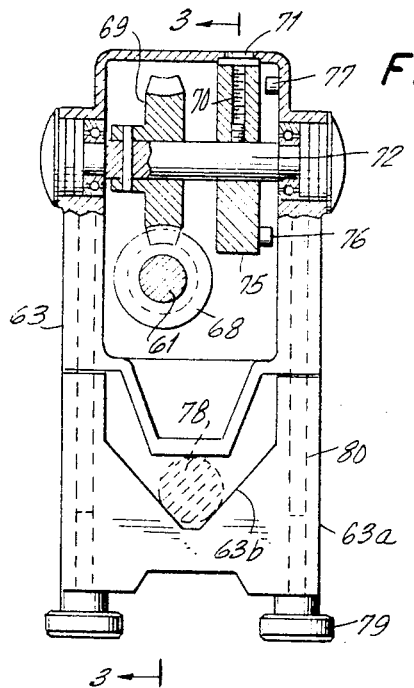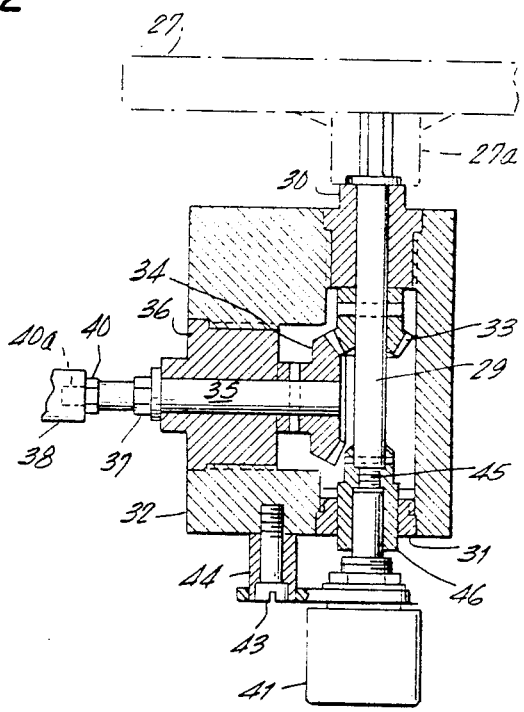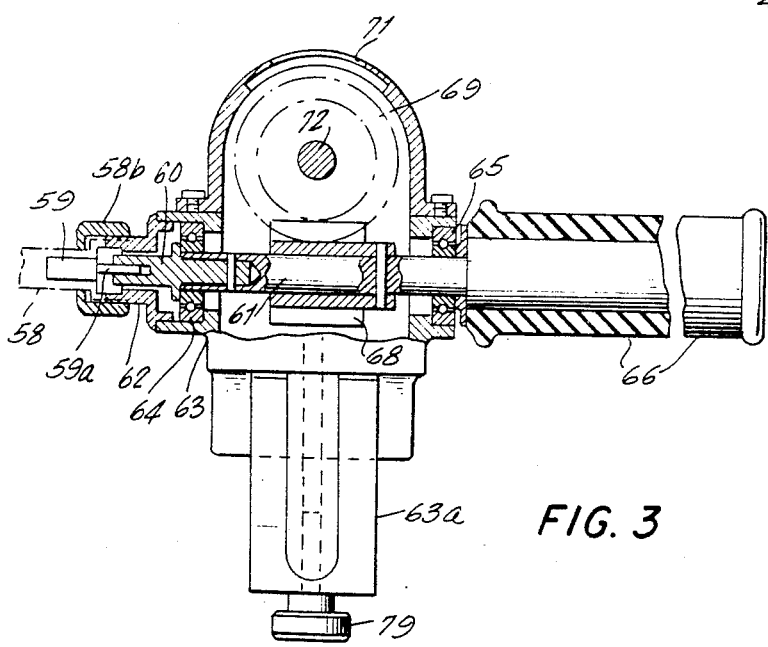

3,424,514
REMOTE CONTROL MECHANISM FOR A
VARIFOCAL LENS
Frank G. Back, Glen Cove, and Ludwig Sterflinger,
Syosset, N.Y., assignors to Zoomar, Inc., Glen
Cove, N.Y., a corporation of New York
Filed Apr. 25, 1966, Ser. No. 544,737
U.S. Cl. 350—187                              6 Claims
Int. Cl. G02b 15/16

This invention relates to a mechanism for controlling the zoom and focus functions of mechanically compensated varifocal lenses applied to television cameras.

In furthering the art of varifocal or zoom lenses, it has been found that it is desirable to control the zoom as well as the focus functions from locations remote to the lens system. In addition, it has been found desirable to locate the apparatus which is manipulated by the operator in the exercise of the zoom and focus features, at varying displacements and angular orientations with respect to the housing which contains the lens system. Such remote control of the varifocal lens systems has, heretofore, not been satisfactory with the direct mechanical linkages that have prevailed.

Accordingly, it is an object of the present invention to provide means for controlling varifocal lens systems from remote locations with respect to the lens systems.

Another object of the present invention is to provide flexible means by which the controlling elements for the varifocal lens system may be variably displaced and oriented on a wide variety of cameras with respect to the lens system.

Another object of the present invention is to provide means for indicating the lens position at each distance.

A further object of the present invention is to provide safety means which will prevent the operator from exceeding the limits of the zoom and focus travel of the lens system.

A still further object of the present invention is to provide compact, accurate, and reliable controlling means for the zoom and focus functions of varifocal lens systems.

The invention consists of the construction, combination and arrangement of parts, as herein illustrated, described and claimed.

In the accompany drawings, forming a part hereof, there is illustrated one form of embodiment of the invention, in which drawing similar reference characters designate corresponding parts, and in which:

FIGURE 1 is a plan view of the varifocal lens system and shows the mechanism for controlling the zoom and focus functions.

FIGURE 2 is a sectional view taken along line 2—2 in FIGURE 1, and shows the focus indication as well as the safety means which prevents the operator from moving the focusing lens beyond the limits of the focus range.

FIGURE 3 is a sectional view taken along line 3—3 in FIGURE 2, and shows the input means by which the operator controls the focus function, and the constructional details for connecting the input means to a flexible transmission element.

FIGURE 4 is a sectional view of the apparatus which the operator manipulates to control the zoom function of the lens system.

Referring to the drawing and particularly FIGURE 1, the housing for the varifocal lens system is designated by 10. Supporting wall members 11 and 12 are carried within the housing and are secured thereto. The wall members 11 and 12 support a mechanically or optically compensated varifocal lens system 13 within the housing 10. An opening 14 is provided in the front of the housing 10 to admit light into the lens system 13. The lens system projects through a second opening 15 in the housing 10 for engagement with a camera (not shown).

The varifocal lens assembly 13 illustrated by way of example, is provided with a rotatable focusing ring 16 which is threadably received within a stationary barrel 17 for focusing purposes. A second rotatable barrel 18 is journaled within the fixed barrel portion of the varifocal lens assembly, and is operated through a series of cams, followers and other mechanical apparatus commonly known in the varifocal lens art, to bring about the desired movement of the variator and compensator lens elements to achieve the full zoom range. It has been found that the only practical method for achieving this movement with accuracy, is to provide a rotationally disposed mechanical member such as the barrel 18 for this purpose.

It will be apparent to those skilled in the art that the operator of the varifocal lens will require a mechanism whereby he can zoom to the desired point in the range of the lens system, and thereafter focus the system if necessary. At the same time, it will also be apparent to those skilled in the art that it is desirable to control the functions of the varifocal lens system by flexible means coupled to the fixed housing of the lens system. The two operations as well as the flexible feature are achieved simply and satifactorily by the mechanism coupled to the varifocal lens system as shown in FIGURE 1, and hereinafter more fully set forth.

The rotatable barrel 18 has fixed to it a sprocket wheel 19 which is linked to a driving sprocket wheel 20 by means of a belt 21. The toothed-belt 21 is shown in fragmentary form so as not to obscure the drawing. Driving sprocket 20 is keyed or fixed to a shaft 22 which rotates in spaced bearing 23. A bushing 24 held within the wall of housing 10 supports the bearing 23 at each of its two ends. In this manner the shaft 22 has the desirel two-point support. A compression spring 25 maintains the driving sprocket 20 against the adjacent bearing 23 and in the proper position along the axis of the shaft. The shaft 22 has, at its lower end, a shoulder which serves to retain the spring firmly against the sprocket 20. The upper end of shaft 22 is connected to a universal joint 26 which forms part of an actuating mechanism to transmit rotary motion to the varifocal lens system.

To "zoom" to a desired point within the range of the lens system, the operator turns the handwheel 27. The handwheel is equipped with a knob 29 to facilate turning the handwheel in a rapid manner when this becomes necessary. The hub 27a of the handwheel is fixed or keyed to the shaft 29 as shown in FIGURE 4. The shaft is rotatable within bearings 30 and 31 which are carried by the housing 32. A bevel gear 33 is fixed to the shaft 29 and rotates with the latter. The teeth of gear 33 mesh with bevel gear 34 mounted on a shaft 35 which is situated at right angles to the shaft 29. The shaft 35 is journaled within the bushing 36 threadably received within the housing 32. To prevent the shaft from slipping axially within the bushing 36, the shaft is held in place at one end by a collar on the bevel gear 34, and at the other end by a nut 37 mounted on the shaft. Shaft 35 is connected at its output end to a second universal joint 38. A connecting rod 39 (see FIGURE 1) couples the universal joint 38 to the universal joint 26.

A universal joint, as is well known, can couple two non-aligned shafts in a manner such that any rotation of one shaft results in a corresponding rotation of the other shaft. A universal joint, therefore, makes possible the precise transmission of motion between two shafts whose axes are noncoincident or nonparallel. By coupling the universal joints 26 and 38, as illustrated in FIGURE 1, it is possible to transmit the rotary motion of the handwheel 27 directly to the barrel 18 of the varifocal lens system. This feature of direct and positive transmission of motion is obtainable with the design of FIGURE 1, even though the input unit as represented by handwheel 27 in angularly offset from the drive shaft 22. For purposes of engaging the universal joints, shafts 22 and 35 have, at their respective ends, a collar 40 with a tang 40a. The tang serves as a key, so that any rotation of the shaft is directly transmitted to the input section of the universal joint.

To prevent the operator from driving the handwheel 27 beyond the lower or upper limits of the range of the varifocal lens assembly, a limit stop is directly coupled to the shaft 29 at the end opposite to the one which carries the handwheel. This limit stop which is a standard component well known in the art, is retained within the housing 41. The latter is supported by means of the bracket 42 and bolt 43 which is threadably received by the housing 32. A spacing element 44 compensates for the distance that the brackets 42 is removed from the housing 32. A threaded coupling 45 connects shaft 29 to the limit stop. Shaft 29 is fixed to the external coupling 46 which is rotatable within the bushing 31.

The focusing of the varifocal lens system after it has been zoomed to the desired point, is accomplished through the rotation of the barrel 16 as already described. A spur gear 47 is secured around the focusing ring 16. This gear meshes with the pinion 48, which is supported by an elongated shaft 49 rotatable in bearings 50 and 51. Bearing 50 is held by the wall 11, and bearing 51 is similarly retained by the wall of housing 10 to provide two-point support for the shaft 49. For purposes of driving the shaft, a sprocket 52 is fixed to the shaft. The sprocket 52 is driven by means of the toothed belt 53 which is linked, in turn, to sprocket 54. The latter is carried by a shaft 55, rotatable within bearing 56 supported by bushing 57, which is held by the housing 10. The toothed belt 53 is thus disposed within the path of travel of belt 21. A flexible shaft 58 is connected to the driving shaft 55 by means of the coupling 58a. In order that the rotational motion of the flexible shaft be directly transmittable to the solid driving shaft 55, the flexible shaft has at its end a tang (not shown) which engages shaft 55 in the same manner as described with respect to the universal joints. The details of this method of coupling become more apparent when referring to the other end of the flexible shaft as illustrated in FIGURE 3.

The member 59 is secured to the end of the flexible shaft and carries the tang 59a which engages a mating slot within the female member 60. The latter is pinned to the driving shaft 61. The end of the flexible shaft is provided with a ferrule within the coupling nut 58b to enable the latter to hold the end of the shaft in place by being threadably received by the connecting element 62. The element 62 is fixed to the housing 63 which supports the transmission elements for manual operation of the focusing mechanism. Shaft 61 is supported by bearings 64 and 65, and is driven by the control handle 66 which the operator rotates to obtain the proper focus. As illustrated in FIGURE 3, the handle is directly attached to the shaft 61. By tracing the described mechanism therefore, it may be seen that any manual rotation of the handle 66 is directly transmitted to the focusing ring 16 of the varifocal lens assembly. In addition, the flexible shaft 58 allows the manual input mechanism to be displaced from the lens assembly in any desired manner for installation purposes.

The shaft 61 also has pinned thereto a threaded worm 68. The worm 68 drives a worm gear 69 secured to a shaft 72 within the housing 63. An indicator scale 70 is also secured to the shaft 72 and turns with it. The scale 70 may be viewed through an opening 71 in the housing 63. The scale 70 is thus driven by the motion of the handle, and therefore enables the operator to set his camera at the focusing distance.

A limit stop 76 is mounted on the scale disc 75. A complementary stop 77 is fixed to the housing 63, and is located within the path of motion of the disc stop 76. The worm-gear arrangement is designed so that one revolution of the shaft 72 represents the complete focusing range. Accordingly, when approaching the lower limit of the focusing range, projecting stop 76 contacts stop 77 along one line of tangency. When, on the other hand, the upper limit of the range is approached, the disc stop 76 contacts stop 77 at the diametrically opposite line. The stop 77 therefore, serves to limit the clockwise as well as the counter-clockwise motions of the shaft 72 and hence of handle 66. The disc 75 also provides a convenient means for carrying the indicating scale 70. The focusing ring 16 is provided with slip-clutches (not shown) at each end of its travel. When the handle 66 is rotated in each direction to the limit of its travel, the scale 70 will automatically be adjusted.

To firmly mount the housing 63 to, for example, a tripod, the housing has a separable clamp section 63a containing a V notch 63b. The tripod rod 78 may be located within the notch 63b, and fastened in place by means of the thumb screws 79. The thumb screws are threadably received within sleeves 80.

As a further safety measure, the varifocal lens assembly 13 includes slip-clutches associated with the zoom movements of the lenses. These clutches prevent damage to the optical system by slipping in the commonly known manner when the limits of either one of these ranges are exceeded. The clutches, well known in the art, will prevent the zoom mechanism from responding to the manual rotations of handwheel 27 when the appropriate limits have been reached. Under this condition, the clutches which are generally spring-loaded discs separated by friction material, will rotate relative to one another, and thus allow the mechanism of the lens assembly to be stationary while the operator continues to apply input motions. Although the limit stops serve as safety devices with respect to this particular function, the slip-clutches provide additionally safety in that they will commence to function in the event that the limit stops fail.

Having thus fully described the invention, what is claimed as new and desired to be secured by Letters Patent of the United States, is:

1. A control mechanism for a varifocal lens system having a rotatable ring for focusing and a rotatable barrel for driving the movable lens elements comprising, a main housing supporting said lens system and the elements of said control mechanism situated adjacent to said system, a first year means fixed to said ring for focusing, a pinion meshing with said first gear means and serving as the driver for the focusing barrel, a first shaft supported by bearings within said housing for retaining said pinion in mesh with said first gear means, a first sprocket means fixed to said first shaft, a second sprocket means mounted on a second rotatable shaft supported in bearings retained by a bushing fixed to said housing, means for drivably linking said first and second sprocket means, a focus control housing separated from said main housing, an input shaft supported in bearings held by said focus control housing, a worm mounted on said input shaft, a worm gear meshing with said worm, an indicator shaft for supporting said worm gear, an indicating scale on said indicator shaft to display the focusing distance, a limit stop associated with said indicating scale to prevent rotation of the latter when the limits of the focusing range are reached, flexible means for coupling said input shaft to said first shaft, a third sprocket means fixed to said barrel for driving the movable zoom lens elements, a fourth sprocket carried by the housing and means for linking it to said third sprocket, an intermediate shaft for supporting said fourth sprocket within said main housing, a universal joint coupled to said intermediate shaft, a handwheel for moving the lens system to the desired point within the zoom range, gear means interconnecting the universal joint and handwheel, and a limit stop associated with said handwheel to prevent the latter from exceeding the limits of the zoom range.

2. The control mechanism as defined in claim 1 including a zoom control housing, a handwheel shaft supported by bushings within said zoom control housing, said limit stop associated with said handwheel being coupled to said handwheel shaft, and a housing output shaft geared to said handwheel shaft.

3. The control mechanism as defined in claim 2, including a first bevel gear fixed to said handwheel shaft, and a second bevel gear fixed to said housing output shaft, said bevel gears meshing and serving as means for coupling the handwheel and housing output shafts.

4. The control mechanism as defined in claim 3, wherein said housing output shaft projects with one end out of the housing, and a second universal joint connects said projecting shaft end to the universal joint fixed to said intermediate shaft.

5. The control mechanism as defined in claim 1, wherein said flexible means for coupling said indicator shaft to said second shaft comprises a flexible shaft.

6. The control mechanism as defined in claim 1, wherein said input shaft projects from the focus control housing and is provided with a handle which may be mechanically rotated during the focusing operation.

References Cited
UNITED STATES PATENTS 1,950,166   3/1934   Durholz _____ 350—187

DAVID SCHONBERG, *Primary Examiner.*

RONALD J. STERN, *Assistant Examiner.*

U.S. Cl. X.R.

95—45